Patented Sept. 3, 1946

2,406,892

UNITED STATES PATENT OFFICE 2,406,892

N-BENZYL-N-ALKYL MORPHOLINIUM COMPOUNDS

Joseph B. Niederl, Victor Niederl, and Martin E. McGreal, Brooklyn, N. Y.

No Drawing. Continuation of application Serial No. 393,672, May 15, 1941. This application January 1, 1943, Serial No. 471,024

1 Claim. (Cl. 260—247)

This invention relates to N-benzyl-N-alkyl morpholinium compounds and particularly to such N-benzyl-N-alkyl morpholinium compounds having from 12 to 18 carbon atoms in the alkyl radical. More specifically, the invention relates to potent bactericidal agents, such as, N-benzyl-N-cetyl morpholinium chloride.

This application is a continuation of application Serial No. 393,672, filed May 15, 1941.

The N-benzyl-N-alkyl morpholinium compounds of this invention may be prepared by several methods. Most conveniently when preparing N-benzyl-N-alkyl morpholinium halides, the N-alkylated morpholine is treated with a benzyl halide. Generally speaking, the reaction may be carried to completion at room or at elevated temperatures and in the presence or in the absence of an inert solvent. Thus, any of the lower molecular N-alkylated morpholines, such as, N-methyl, N-ethyl, N-propyl, N-butyl, or N-amyl morpholine; or any of the higher molecular alkylated morpholines, such as, N-lauryl, N-myristyl, N-cetyl or N-octadecyl morpholine, described in patent application Serial No. 435,638, filed March 21, 1942, may be subjected to the action of benzyl chloride or benzyl bromide to yield the respective N-benzyl-N-alkyl morpholinium halides.

In another method for preparing the N-benzyl-N-alkyl morpholinium halides, N-benzyl morpholine having a boiling point of 160° to 161° C. is reacted with a lower molecular or higher molecular alkyl halide, such as, ethyl, methyl, n-propyl, n-butyl, and n-amyl iodides or lauryl, myristyl, cetyl and octadecyl bromides and the like.

Among the N-benzyl-N-alkyl morpholinium halides prepared in accordance with the previously discussed processes are:

N-benzyl-N-methyl morpholinium halides
N-benzyl-N-ethyl morpholinium halides
N-benzyl-N-n-propyl morpholinium halides
N-benzyl-N-n-butyl morpholinium halides
N-benzyl-N-n-amyl morpholinium halides
N-benzyl-N-lauryl morpholinium halides
N-benzyl-N-myristyl morpholinium halides
N-benzyl-N-cetyl morpholinium halides
N-benzyl-N-octadecyl morpholinium halides
N-benzyl-N-phenyl morpholinium halides While it is not necessary to use solvents in carrying out the reactions of this invention, solvents or diluents may be used, including esters, such as, ethyl acetate; hydrocarbons, such as, benzene, toluene, petroleum ether, and the like; alcohols, such as, ethyl and methyl alcohol; ethers, such as diethyl and diisopropyl ethers; and like inert solvents. In a special embodiment of the invention, the reaction is carried out in the presence of a solvent which dissolves the reactants but precipitates out the reaction products, especially if the solvent is cool. When operating in this manner, the N-benzyl-N-alkyl morpholinium salts may be separated out in a purified form without the necessity of removing the solvent. Various solvents may serve this dual purpose as a homogenizing and a crystallizing medium. For practical reasons, ethyl acetate seems to be the most appropriate solvent of this type. It should be understood, therefore, that claims directed to reactions taking place in the presence of ethyl acetate encompass such equivalents.

In accordance with one embodiment of the invention, temperatures are regulated in such a manner that the reactants are retained in a liquid phase during the reaction. Generally speaking, water or steam baths provide sufficiently high temperatures for such a purpose.

When the reactants are mixed together without diluents or solvents, suitable concentrated aqueous solutions of the reaction product may be formed merely by the addition of water without the necessity of expensive separatory, crystallizing or purifying steps.

The following examples disclose illustrative embodiments of the invention but are not to be considered a limitation upon it.

*Example 1.—N-benzyl-N-alkyl morpholinium chlorides*

One mole, 311 grams, of N-cetyl morpholine having a M. P. of 28° C. and a B. P. of 184° C. at 4 mm. pressure, is placed in a one liter round-bottomed flask and 126 grams of freshly distilled benzyl chloride are added. The flask is sealed tightly with a rubber stopper, placed in a steam bath and heated for 12 hours at 100° C. with occasional agitation. After the reaction mixture is cooled, a light colored solid is obtained. The material is further purified by recrystallization from hot ethyl acetate.

If it is desired to form a concentrated aqueous solution of N-benzyl-N-cetyl morpholinium chloride, water is added directly to the reaction product. For instance, the N-benzyl-N-cetyl morpholinium chloride derived from the previously described reaction may be transferred to an appropriate vessel and mixed with 1748 ml. of water to form a 20% aqueous solution. In a like manner, aqueous solutions having a concentration of 5% to 50% of N-benzyl-N-cetyl morpholinium chloride, may be prepared by dissolving the reaction product in the appropriate volume of water.

Such concentrated aqueous solutions of N-benzyl-N-cetyl morpholinium chloride are very valuable and convenient for preparing desired disinfecting and sterilizing solutions merely by further addition of water.

Similarly, one-tenth mole of freshly distilled N-cetyl morpholine and one-tenth mole of freshly distilled benzyl chloride may be reacted in an appropriate tube having a capacity of 50 to 60 cc. After the introduction of the reactants into the tube they are thoroughly mixed and the tube is sealed and placed in a boiling water bath. After 4 hours, the contents of the tube will solidify upon cooling. After 12 hours, the reaction is completed and the reaction product is soluble in water in all proportions. In order to crystallize out the N-benzyl-N-cetyl morpholinium chloride, the contents of the tube are transferred to a flask, such as, a 250 cc. Erlenmeyer flask, and boiled with 100 cc. of ethyl acetate. The boiling is continued until the entire contents of the tube are dissolved. Then, the resulting solution is allowed to stand at room temperature for one hour, whereupon 31 grams of N-benzyl-N-cetyl morpholinium chloride crystallize out. The crystals are filtered off and the mother liquor is concentrated to yield additional crystals of the quaternary ammonium salt.

The N-benzyl-N-cetyl morpholinium chloride produced as described hereinbefore begins to sinter at 85° C. and is completely melted at 150° C.

In a similar manner, by using appropriate N-alkyl morpholines, the following N-benzyl-N-alkyl morpholinium chlorides are produced:

N-benzyl-N-methyl morpholinium chloride, M. P. 229° C.
N-benzyl-N-ethyl morpholinium chloride, M. P. 150° C.
N-benzyl-N-lauryl morpholinium chloride, M. P. 120° C.
N-benzyl-N-myristyl morpholinium chloride, M. P. 135° C.
N-benzyl-N-cetyl morpholinium chloride, M. P. 150° C.
N-benzyl-N-octadecyl morpholinium chloride, M. P. 165° C.

The previously described processes for producing N-benzyl-N-alkyl morpholinium chlorides are generally applicable. Normally, one mole of freshly distilled N-alkyl morpholine is placed in a suitable reaction vessel which can be sealed or otherwise closed, such as in an autoclave, or introduced into a reaction vessel provided with a reflux condenser having a drying tube attached to ensure thoroughly anhydrous conditions. Thereafter, one mole of freshly distilled benzyl chloride is added. The two reactants are mixed thoroughly and the reaction vessel closed. Then the reaction mixture preferably is heated to about 100° C. and the heating continued until the reaction mixture becomes solid on cooling and until it becomes completely soluble in water. This reaction usually requires from 4 to 12 hours.

After the reaction is completed, further working up of the reaction product depends upon whether the product is to be used as a crystalline solid or in concentrated aqueous solutions. When the crystallized product is desired, it is either crystallized out of the reaction mixture or is precipitated out by the addition of a suitable diluent, such as, ethyl acetate, diethyl ether, petroleum ether, benzene, toluene, or the like. Preferably, the N-benzyl-N-alkyl morpholinium chloride is then recrystallized from hot ethyl acetate.

When aqueous solutions are desired, the reaction mixture is merely distilled with an appropriate amount of water to yield, for example, concentrations of 50%, 30% or 20%. The reaction mass may be pre-treated with suitable adsorbents or subjected to filtration, to increase its purity, before being diluted with the water.

*Example 2.—N-benzyl-N-alkyl morpholinium bromides*

One mole of freshly distilled N-alkyl morpholine is diluted with about 2 parts per volume of ethyl acetate and introduced into a suitable glass vessel. Thereafter, one mole of freshly distilled benzyl bromide is introduced into the reaction vessel. The reaction mass is thoroughly shaken and allowed to stand at room temperature. After about 12 hours, a nearly quantitative yield of the reaction product, N-benzyl-N-alkyl morpholinium bromide, is obtained. Thereupon, the crystals are filtered off and recrystallized from ethyl acetate. The mother liquor, upon concentration under reduced pressure, yields additional crystals of N-benzyl-N-alkyl morpholinium bromides.

For example, one-tenth mole, 31 grams, of N-cetyl morpholine is diluted with 50 ml. of ethyl acetate and introduced into a 250 ml. Erlenmeyer flask. Thereupon, one-tenth mole, 17 grams, of freshly distilled benzyl bromide is slowly introduced into the flask. After the completion of the addition of the benzyl bromide, the mixture is thoroughly shaken, closed with a stopper and set aside at room temperature for at least 12 hours. At the end of this period of time, 40 grams of N-benzyl-N-cetyl bromide have crystallized out. The crystals then may be filtered off and recrystallized from hot ethyl acetate. If the mother liquor is concentrated under reduced pressure, additional crystals of the N-benzyl-N-cetyl morpholinium bromide will form. This operation may be repeated until all the quaternary morpholinium salt is isolated.

The N-benzyl-N-cetyl morpholinium bromide begins to sinter at about 85° C. and is completely melted at about 130° C.

In a similar manner, the following N-benzyl-N-alkyl morpholinium bromides have been prepared by reacting appropriate N-alkyl morpholines with benzyl bromide.

N-benzyl-N-methyl morpholinium bromide, M. P. 251° C.
N-benzyl-N-ethyl morpholinium bromide, M. P. 175° C.
N-benzyl-N-lauryl morpholinium bromide, M. P. 102° C.
N-benzyl-N-myristyl morpholinium bromide, M. P. 117° C.
N-benzyl-N-cetyl morpholinium bromide, M. P. 130° C.
N-benzyl-N-octadecyl morpholinium bromide, M. P. 145° C.
N-benzyl-N-phenyl morpholinium bromide, M. P. 146° C.

The previous examples disclose reactions involving molar ratios. An excess of either of the reagents may be present, however, without deleteriously affecting the results since the reactions will take place in equimolar proportions.

The N-benzyl-N-alkyl morpholinium halides prepared as previously described may be used for the preparation of other N-benzyl-N-alkyl morpholinium salts. For instance, N-benzyl-N-alkyl morpholinium sulfates, including the alkyl sulfates, such as, metho- and ethosulfates, or nitrates and the like, are obtained by treating the halides with silver, sodium or potassium salts of the appropriate mineral or organic acids or mono esters. Thus, the sulfates and nitrates are prepared by treating the chlorides or bromides, respectively, with silver sulfate or silver nitrate. The alkyl sulfates are best prepared by refluxing a halide with sodium or potassium salts of the respective mono alkyl sulfates, such as, sodium methosulfate or potassium ethosulfate, and the like, dissolved in an alcoholic solution. Compounds produced in this manner include N-benzyl-N-alkyl morpholinium salts having from 12 to 18 carbon atoms in the alkyl radical, such as, N-benzyl-N-cetyl morpholinium nitrate, N-benzyl-N-cetyl morpholinium sulfate, N-benzyl-N-cetyl morpholinium ethosulfate, N-benzyl-N-cetyl morpholinium methosulfate, and the like.

It will be understood that the embodiments of my invention described in the specification and illustrated by the examples are only illustrative of the compounds and the processes by which they are produced. Various modifications can be made without departing from the principles of the invention.

We claim:

N-benzyl-N-cetyl morpholinium ethosulfate.

JOSEPH B. NIEDERL.
VICTOR NIEDERL.
MARTIN E. McGREAL.